R. T. NEWTON.
AUTOMOBILE BUMPER.
APPLICATION FILED JUNE 7, 1921.
1,432,723.
Patented Oct. 17, 1922.
3 SHEETS—SHEET 1
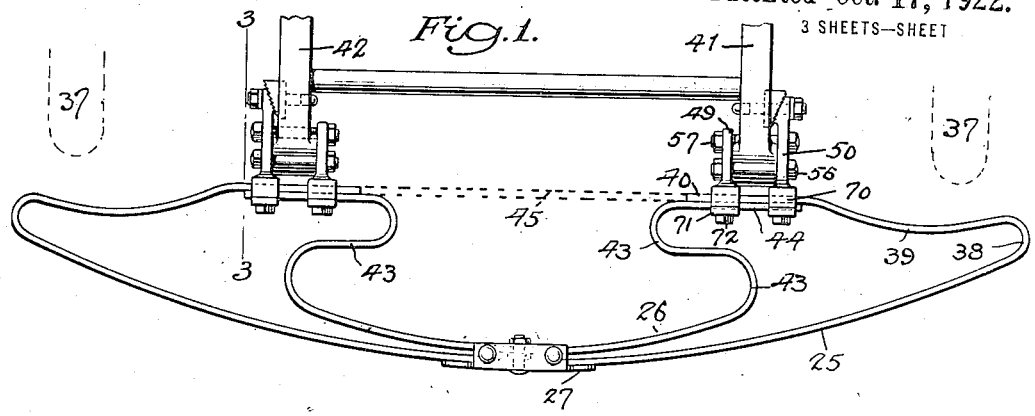
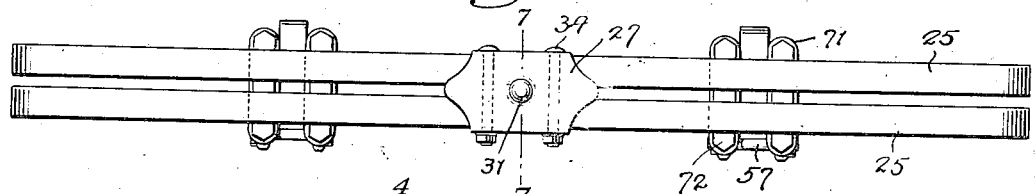
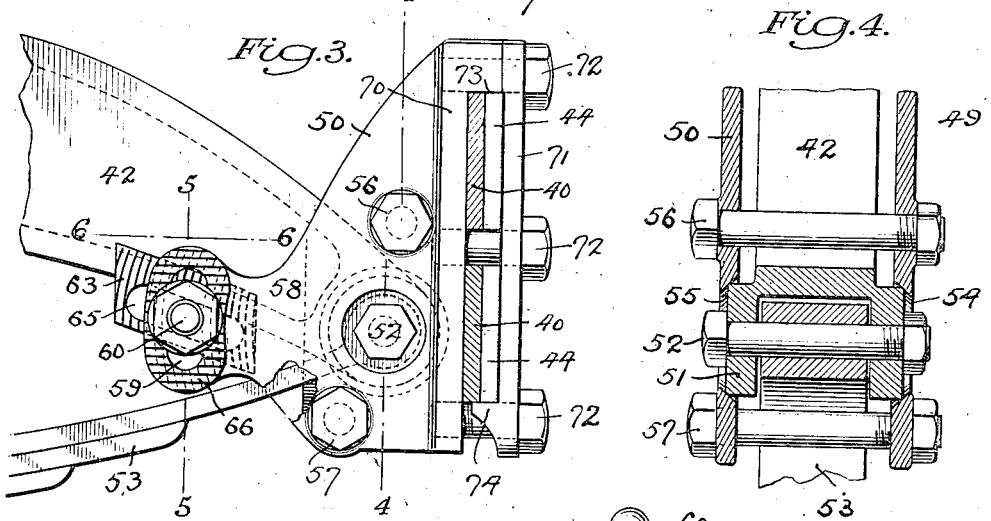
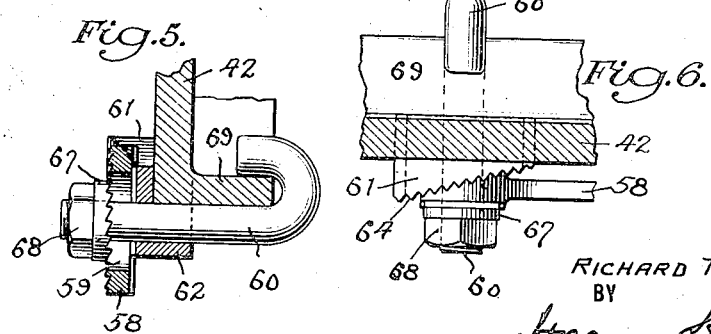
INVENTOR
RICHARD T. NEWTON
BY
ATTORNEYS R. T. NEWTON.
AUTOMOBILE BUMPER.
APPLICATION FILED JUNE 7, 1921.
1,432,723.
Patented Oct. 17, 1922.
3 SHEETS—SHEET 2.
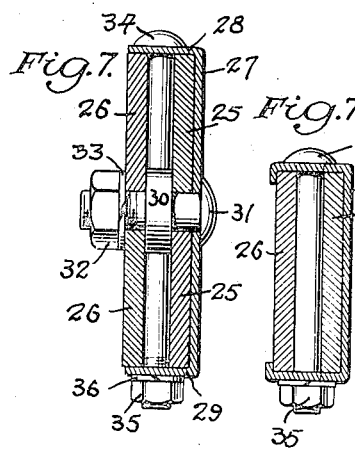
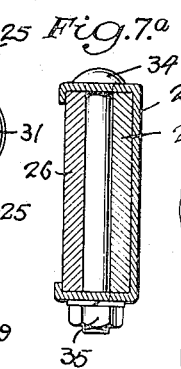
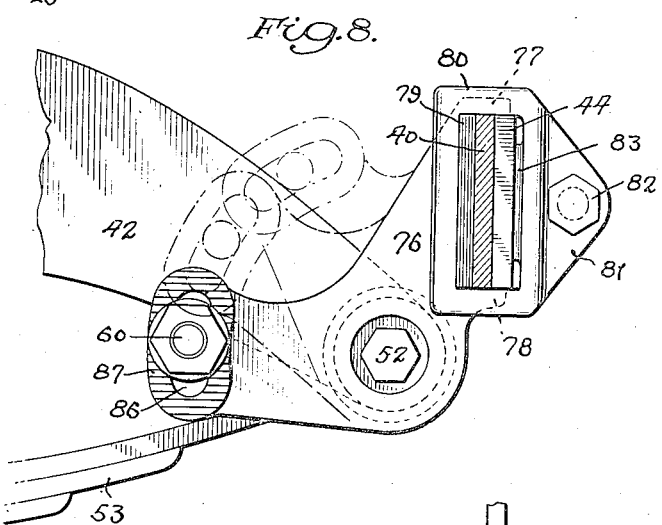
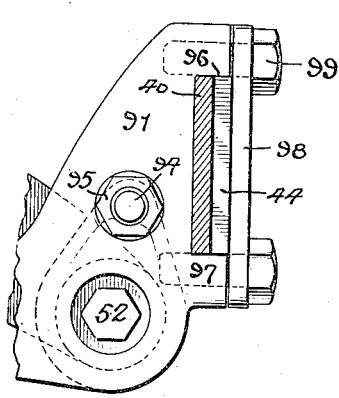
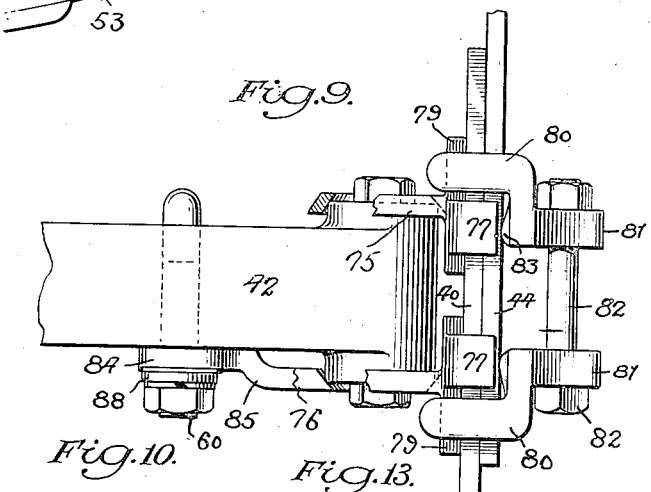
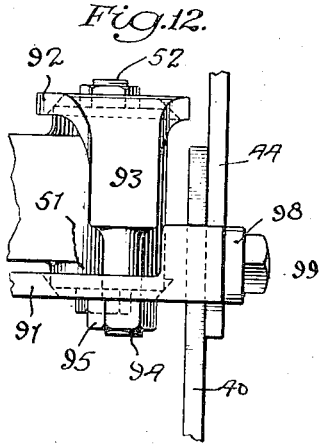
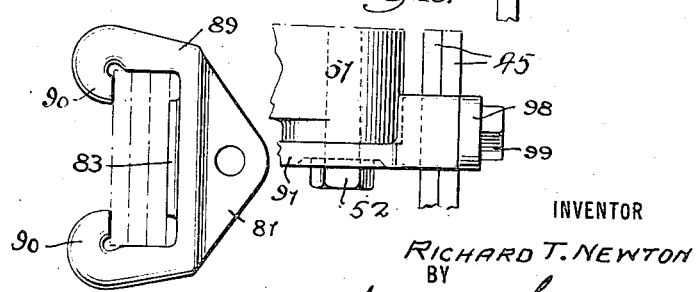
INVENTOR
RICHARD T. NEWTON
BY
ATTORNEYS

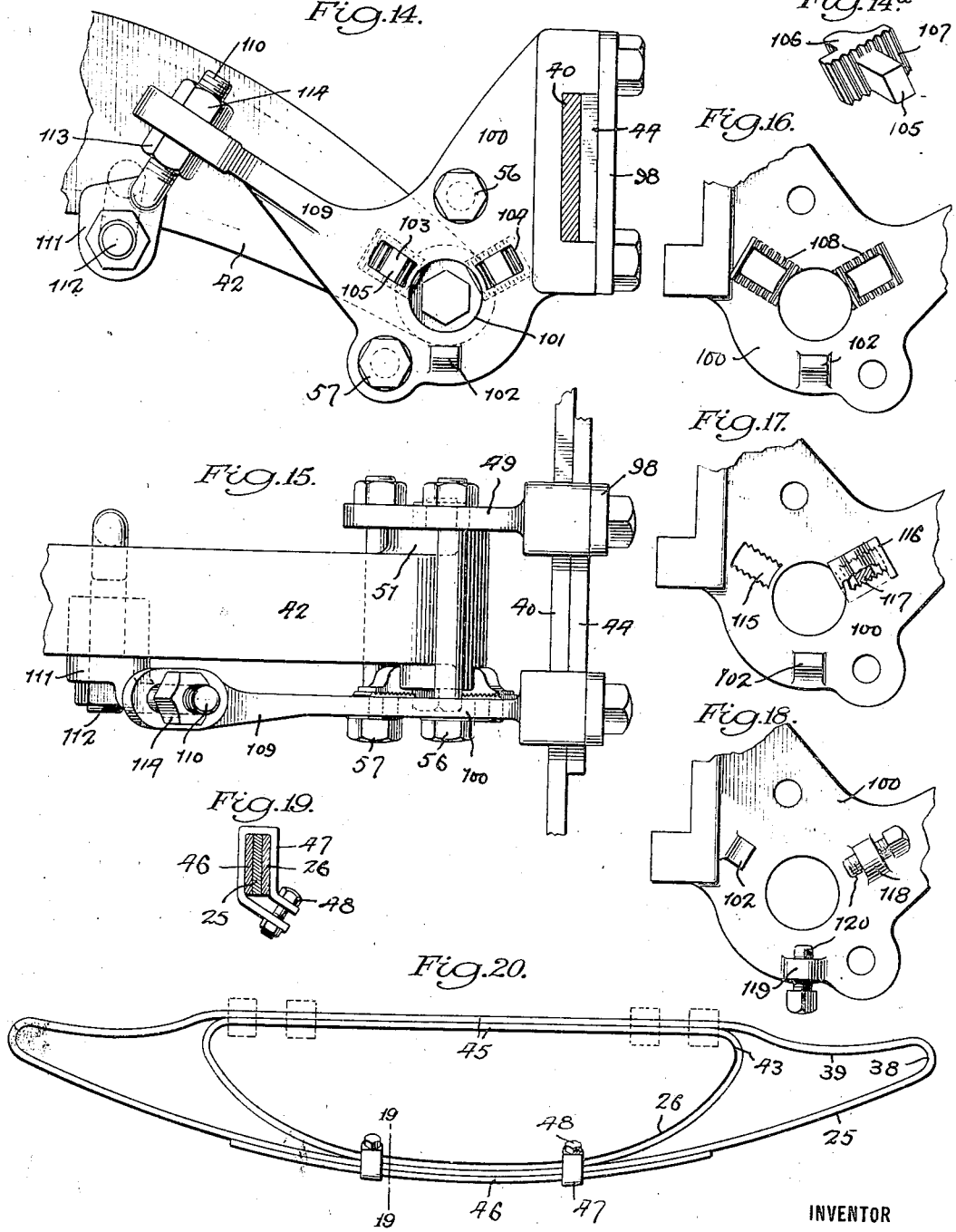

Patented Oct. 17, 1922.

1,432,723

UNITED STATES PATENT OFFICE.

RICHARD T. NEWTON, OF NEW YORK, N. Y.

AUTOMOBILE BUMPER.

Application filed June 7, 1921. Serial No. 475,704.

*To all whom it may concern:*

Be it known that I, RICHARD T. NEWTON, a citizen of the United States of America, residing at New York city, in the county of New York and State of New York, have invented certain new and useful Improvements in Automobile Bumpers, of which the following is a specification.

My invention relates to automobile bumpers and their support, and the object of my invention is to provide a bumper and supporting bracket, both of improved construction, the bumper having certain features of novelty over my Patent No. 1,380,239, dated May 31, 1921, and the supporting means being such that the connection between the bumper supporting arms and the bracket are adjustable to chassis of different widths. The features of novelty will be hereinafter more specifically pointed out or shown in the accompanying drawings, in which—

Fig. 1 is a plan of a bumper in which my invention is embodied in one form, and an associated bracket support therefor of novel construction;

Fig. 2 is a front elevation thereof;

Fig. 3 is a section on the line 3—3, Fig. 1;

Figs. 4, 5 and 6 are respectively sections on the lines 4—4, 5—5 and 6—6, Fig. 3;

Fig. 7 is a section on the line 7—7, Fig. 2;

Fig. 7ª is a similar view of a modified construction;

Fig. 8 is a section corresponding to Fig. 3, but illustrating the modification shown in Fig. 7ª;

Fig. 9 is a broken plan view of this modification;

Fig. 10 is a side elevation in detail of the bumper clamp shown in Fig. 9;

Fig. 11 is a vertical section of a further modification of the clamp;

Fig. 12 is a plan thereof;

Fig. 13 is a plan of a detail of the clamp shown in Fig. 12;

Fig. 14 is a side elevation of a supporting bracket of further modified construction;

Fig. 14ª is a perspective of a detail of the clamp;

Fig. 15 is a plan of the clamp shown in Fig. 14;

Fig. 16 is a side elevation of portion of the clamp showing the adjustable lugs of Fig. 14ª in position;

Fig. 17 is a similar view showing one of the lugs broken away and one entirely removed;

Fig. 18 is a further modification of the clamp construction;

Fig. 19 is a section on the line 19—19, Fig. 20: and

Fig. 20 is a plan of a bumper of further modified construction.

The present bumper has in common with the bumper of my patent above mentioned, an impact member 25 of spring strap metal and a spring mid support 26 therefor, both elements of the bumper being carried back to a suitable bracket support. As here indicated, the bumper comprises two similar impact and supporting members 25 and 26 vertically superposed and spaced apart to afford an impact area of considerable vertical extent. Any suitable means may be used to space the members apart at the front of the bumper, such, for instance, as a clamp 27 (Fig. 7) having top and bottom flanges 28 and 29, which overlie the upper and lower edges respectively of the combined front. Between the impact and supporting members 25 and 26 is arranged a spacing washer 30 pierced to accommodate the shank of the bolt 31 which passes through the front clamp 27 at a point between the upper and lower impact members 25 and is engaged to the rear of the supporting members 26 by a nut 32 and interposed lock washer 33. Passing through the upper and lower flanges 28 and 29 of the clamp 27 are vertically arranged bolts 34, the shanks of which are accommodated between the impact and supporting members 25 and 26, while the threaded lower ends are engaged by the nuts 35 and lock washer 36. Proper alignment of the impact members 25, and their operative association with the supporting members 26, is thus secured.

As indicated in Fig. 1, the impact members 25 are bowed transversely of the chassis and extend sufficiently outboard of the latter to protect the wheels 37 on opposite sides thereof. The ends of the impact members are re-curved at 38 in a spring bend, which is continued to form a spring supporting arm 38 slightly bowed toward the impact member and terminating in a straight attaching end 40 adapted to be secured to the bracket hereinafter described. The supporting member 26, which has a transverse extent substantially co-extensive with the chassis side bars 41 and 42, extends on a gradual curve from the mid clamp 27 to end bends 43 terminating in straight attaching ends 44 which lie parallel to the attaching ends 40 for the impact member supporting arms, and like the latter are arranged transversely to the plane of the chassis side bars 41 and 42 for engagement by the bracket hereinafter described. In the construction herein shown, the re-curved end of the supporting chamber 26 has an S-shape imparted thereto, so that its attaching end 44 approaches the supporting bracket in opposite direction to that of the impact member attaching end 40. If desired, a single end bend may be imparted to the supporting member 26, as indicated in Fig. 20. Furthermore, either one, or both the impact member and the supporting member may be made in the form of a continuous loop, as indicated in Fig. 20, in which case the flattened rear side 45 of the loop, or loops, forms a rigid barrier which prevents the inward deflection of the impact and supporting members beyond the point at which they are forced into engagement with said barrier upon impact. The radiator and associated parts are therefore more securely protected against injury, while at the same time sufficient cushioning action is afforded to take up ordinary shocks.

If desired, I may provide the impact member with a reinforcing spring bar 46 (Fig. 20) lying in front of each of the impact members 25 of a double bumper, or as a single unit common thereto, or where a bumper of the single type is used, lying in front of its impact member, as indicated in Fig. 19. This reinforcing member is secured to the impact member by clamps 47, which also embrace the supporting member 26, the several elements being united by the bolts 48 passing through the inwardly offset ends of the clamps 47.

It is to be understood that the shapes imparted to the double bumper of Figs. 1 to 4 may be utilized to advantage in a single bumper of the type shown in my patent above mentioned, and I do not limit the present invention as to the configuration of the spring elements to a double bumper of the type shown in these figures. The single bumper type is illustrated in Figs. 8 to 20 for the purpose of drawing attention to this fact. The double bumper construction is shown in Figs. 1 to 4, primarily to afford a suitable illustration of a bumper which may be used with the bracket about to be described.

The brackets shown in Figs. 1 to 6, comprise, in each case, a pair of plates 49 and 50 straddling the end of the chassis side bar and clamped to the usual head 51 thereof, through which the spring bolt 52 passes, and from which the supporting leaf spring 53 is hung. To accommodate the chassis head 51 and the spring bolt 52, the clamp plates 49 and 50 are provided with beveled apertures or bosses 54 and 55, the beveled sides of which are designed to accommodate the plates to chassis heads of different chassis for different makes of cars. The plates are clamped in position by bolts 56 and 57, respectively overlying and underlying the chassis head 51. In order to provide for angular adjustment of the bracket on the chassis end, and thus to insure the installation of the bumper in proper horizontal position, the plate 50 is provided with a rearwardly extending arm 58 having an arcuate slot 59 in which the anchor bolt 60 is accommodated. Inasmuch as the chassis head 51 projects laterally different distances from the side of the chassis horn 41 or 42 in different makes of cars, and the bolt 60 is thus spaced different distances from the side of the chassis horn, in this form, I provide an adjustable spacing washer 61 which may be interposed between the arm 58 and the side of the chassis to maintain the proper alignment of the plate 50 with respect to the chassis. In the form here shown a wedge-shaped washer 61 is provided for this purpose, having a flange 62 which underlies the chassis side bar, and a vertical wedge face 63 serrated to cooperate with the similarly inclined and serrated face 64 (Fig. 6) of the arm 58. The washer is longitudinally slotted at 65 to permit its longitudinal adjustment on the chassis side bar, and thus to vary the spacing of the arm 58 from the chassis side bar in accordance with the spacing of its body, depending upon the extent of lateral projection of the chassis head 51. The slot 59 in the arm 58 permits the angular adjustment of the bracket around the axis of the chassis head 51 on which the bracket pivots. The arm may be serrated at 66 to cooperate with the serrated washer 67 held by the nut 68 against the arm 58 in clamping position. As here shown, the bolt 60 is of the usual type, which engages the lower flange 69 of the chassis side bar. As indicated in Fig. 8, however, the bolt 60 may be passed directly through a hole drilled in the chassis side bar, or it may be arranged above the chassis side bar and its hooked end engaged with the top flange, the only change in construction necessary to permit either of these methods of fastening being a different angular relation between the arm 58 and the body of the bracket.

The attaching ends 40 and 44 of the impact member 25 and mid support 26 lie against the flats 70 at the front of the bracket plates 49 and 50, and are clamped against these surfaces by clamping bars 71 and clamp bolts 72, which pass therethrough and take into holes tapped in the front of the plates 49 and 50. In order to locate the attaching ends 40 and 44 of the bumper elements with precision, the fronts 70 of the clamp plates are provided with tapped offsets 73, while the cooperating clamping bars 71 are provided with a supporting shoulder 74. The mid bolt 72 is located at the space between the upper and lower bumper members in a double bumper of the type shown, and serve to maintain the latter spaced apart in like manner as the bolt 31 at the front clamp.

The bracket shown in Figs. 8, 9 and 10 somewhat simplifies the construction by utilizing the transverse bracket clamping bolts to also hold the bumper attaching ends to the bracket. As will be seen from these figures, the bolts 56 and 57 of the construction first described are omitted. The bracket side plates 75 and 76 here comprise merely upper and lower forwardly extending tapped abutment lugs 77 and 78, between which the bumper attaching ends, here indicated as a single bumper, are accommodated, and rest against the transverse bearing abutments 79 at the front of the bracket plates.

Dog loops 80 slipped upon the outer ends of the abutments 79 for the two plates 75 and 76, and accommodating the attaching ends 40 and 44 of the bumper elements, are provided with offset ears 81 pierced to receive the draw-up bolt 82. Preferably, also, bearing lugs 83 are formed on the inner faces of the ears 81 to bear against the bumper attaching ends. Obviously when the bolt 82 is tightened, not only are the plates 75 and 76 drawn into clamping engagement with the head of the chassis side bar, but the bearing lugs 83 are forced against the attaching ends of the bumper elements with a cramping action, and the latter are thus firmly clamped against the abutments 79 on the side plates 75 and 76 of the bracket.

In this construction the bracket 76 is provided with a rearwardly extending arm 84, which is offset at 85 into engagement with the chassis side bar of the adjusting washer 63, and the construction previously described is dispensed with. The arm 84 is slotted at 86 to permit an angular adjustment of the bracket and is serrated at 87 to cooperate with the serrated washer 88 to hold the bracket in angular adjusted position.

In Fig. 10 the dog loops 80 of Figs. 8 and 9 are substituted by hook dogs 89, the arms of which have hooks 90 shaped to receive the abutment plate 79 and attaching ends 40 and 44 of the bumper elements. A construction of this type facilitates the adjustment of the dog on the bracket plates and bumper ends.

In Figs. 11 and 12 but a single bumper supporting side plate 91 is employed. The side plate 92 forms merely an anchor which engages the opposite side of the chassis head 51 and is provided with an offset shank extension 93 terminating in a threaded stud 94, which passes through the bracket plate 91 and receives the draw-up nut 95 by which the latter is clamped on the chassis side bar. The bumper attaching ends are accommodated between the top and bottom lugs 96 and 97 on the plate 91 and are clamped in position by the vertical clamp bar 98 and bolts 99.

In the construction such as shown in Fig. 20, where the bumper comprises closed loops, the connecting reaches 45 suffice to hold the bracket 91 upon the chassis head, and the anchor plate 92 may be omitted as indicated in Fig. 13.

In the modifications shown in Figs. 14 to 17, the bracket plates 49 and 50 are in their main features analogous to those shown in Figs. 1 to 4, but the accommodation of the plates to chassis heads of different size is accomplished by means of adjustable lugs on one or both of the plates. As here shown the lugs are confined to the main bracket plate 100. Instead of a beveled boss or hole, such as 55 in Figs. 1 and 4, the said plate 100 is apertured at 101 to accommodate the spring bolt 52, and a fixed lug 102 provided to fit against the periphery of the chassis head 51. The plate is slotted at 103 and 104 to receive the stems 105 of lugs 106 radially adjustable with respect to the center of the aperture 101 to the diameter of the chassis head 51. The bodies of the lugs are serrated at 107 to cooperate with the serrations 108 on the inner face of the plate adjacent the slots 103 and 104, so that the lugs may be firmly held in their radially adjusted position.

The angular adjustment of the bracket is secured by means of a rearwardly extending arm 109 which is pierced by a slot to accommodate the adjusting screw bolt 110, the head 111 of which is pierced to receive the shank of the hook bolt 112, which passes beneath and engages the bottom flange of the chassis side bar. The lock nuts 113 and 114 on the adjusting bolt 110 hold the arm in angularly adjusted position.

In Fig. 17 the slots 115 in the plate 100 are internally serrated to accommodate lugs 13

116, the shanks 117 of which are serrated to cooperate with the serrated wall of the slots.

In Fig. 18 the plate 100 is provided with laterally extending lugs 118 and 119 tapped to receive set screws 120, which afford adjustable means for accommodating the plate to chassis heads 51 of different diameters for the same purpose as the lugs 106 of Figs. 14 to 17.

Various other modifications will readily occur to those dealing with this type of device, without departing from what I claim as my invention.

I claim—

1. An automobile bumper comprising an impact member, a spring supporting arm therefor having an attaching end lying substantially at right angles to the plane of the chassis side bar and extending toward the latter from a point outboard thereof, an auxiliary member for supporting the impact member of the bumper, said auxiliary member comprising a spring metal strap device arranged to support the impact area of the impact member and having a spring supporting arm bent on an S-curve and terminating in a reach lying in a plane substantially at right angles to the chassis side bar and extending toward the latter from a point inboard thereof and lying substantially in register with the attaching end of the spring supporting arm of the impact member.

2. An automobile bumper comprising an impact member, a spring supporting arm therefor having an attaching end lying substantially at right angles to the plane of the chassis side bar, an auxiliary member for supporting the impact member of the bumper, said auxiliary member having an attaching end lying in a plane substantially at right angles to the plane of the chassis side bar, in combination with a supporting bracket secured to the chassis, and means for adjustably securing said attaching ends to the bracket.

3. An automobile bumper comprising an impact member, having at each end a spring supporting arm extending from a point outboard of the chassis side bar across the latter and continued between the chassis side bars to form a barrier lying substantially in the plane of the impact member, in combination with an auxiliary supporting member for the impact area of the bar, said auxiliary supporting member having at each end an S-bend spring supporting arm terminating in an attaching portion which extends from a point inboard of the chassis side bar toward the latter and lying in a plane substantially at right angles to the plane of the chassis side bar.

4. In combination with an automobile bumper, attaching means comprising a supporting member adapted to extend alongside of a chassis side bar, and means for supporting the same at longitudinally spaced points, together with a beveled spacing washer adapted to be interposed between said supporting member and chassis at one of said points of support, for the purpose set forth.

5. In combination with an automobile bumper, attaching means comprising a supporting member adapted to extend alongside of a chassis side bar, and means for supporting the same at longitudinally spaced points, together with a beveled spacing washer adapted to be interposed between said supporting member and chassis at one of said points of support, said attaching member having a washer-engaging face inclined to the bevel of said washer.

6. In combination with an automobile bumper, attaching means comprising a supporting member adapted to extend alongside of a chassis side bar, and means for supporting the same at longitudinally spaced points, together with a beveled spacing washer adapted to be interposed between said supporting member and chassis at one of said points of support, said washer being apertured to adjustably accommodate a securing bolt.

7. In combination with an automobile bumper, attaching means comprising a supporting member adapted to extend alongside of a chassis side bar, and means for supporting the same at longitudinally spaced points, together with a beveled spacing washer adapted to be interposed between said supporting member and chassis at one of said points of support, said washer being provided with a longitudinal slot to receive a securing bolt and permit longitudinal adjustment of the washer with respect thereto, for the purpose set forth.

8. In combination with an automobile bumper, attaching means comprising a supporting member adapted to extend alongside of a chassis side bar, and means for supporting the same at longitudinally spaced points, together with a beveled spacing washer adapted to be interposed between said supporting member and chassis at one of said points of support, said attaching member and washer being apertured to accommodate a securing bolt passed therethrough, and being slotted in directions at an angle to each other to permit longitudinal adjustment of the washer along the chassis, and the vertical adjustment of the attaching member substantially as described.

9. A bumper comprising an impact member, spring supporting arms therefor extending from a point out-board of the chassis side bar toward the latter, and having an attaching portion lying substantially at right angles to the plane of the chassis side bar, in combination with an auxiliary supporting member for the impact area of the bar, said auxiliary supporting member having a spring supporting arm having an attaching portion extending from a point in-board of the chassis side bar toward the latter and lying in a plane substantially at right angles to the plane of the chassis side bar.

10. An automobile bumper comprising a pair of vertically superposed impact members, in combination with brackets engaging the opposite chassis side bars, and means for securing to each bracket a pair of attaching ends for said impact members of the bumper.

11. An automobile bumper comprising a pair of vertically superposed impact members, a pair of vertically superposed auxiliary members for supporting said impact members of the bumper, in combination with brackets engaging the opposite chassis side bars, and means for securing to each bracket a pair of attaching ends for said impact and auxiliary supporting members of the bumper.

12. An automobile bumper comprising a pair of vertically superposed impact members, a pair of vertically superposed auxiliary members for supporting said impact members of the bumper, in combination with brackets engaging the opposite chassis side bars for support, and means for securing thereto the attaching ends of said impact and auxiliary supporting members of the bumper, said attaching members extending transversely to the planes of the chassis side bars.

13. An automobile bumper comprising a pair of vertically superposed impact members, a pair of vertically superposed auxiliary members for supporting said impact member of the bumper, in combination with brackets engaging the opposite chassis side bars for support, and means for securing thereto the attaching ends of said impact and auxiliary supporting members of the bumper, said attaching members extending transversely to the planes of the chassis side bars, the means for securing the attaching ends of the bumper elements to the bracket permitting adjustable connection between the bracket and the attaching members dependent upon the spacing between the chassis side bars.

14. An automobile bumper comprising an impact member, an auxiliary support therefor arranged between the same and the chassis, and means for securing said impact member and auxiliary support together in the impact area of the bumper, said means comprising a clamp arranged against the outer face of the impact member, and having top and bottom flanges overlying the upper and lower edges of the impact and auxiliary supporting members, together with a clamping bolt passing through said top and bottom flanges and arranged between the adjacent faces of the impact and auxiliary supporting members.

15. An automobile bumper comprising a pair of vertically superposed impact bars, a pair of vertically superposed auxiliary supporting members arranged between the impact bars and the chassis, and means for clamping said members together in the impact area of the bumper, said clamping means comprising a clamping bolt arranged against the outer face of the impact member and having top and bottom flanges respectively overlying and underlying the structure, securing means passing through the plate between the adjacent edges of the upper end lower impact and auxiliary supporting members of the bumper, spacing means arranged between the impact members and the auxiliary supporting members, together with further securing members passing through the top and bottom flanges of the clamp and arranged between the impact and auxiliary supporting members, substantially as described.

In testimony whereof I have signed my name to this specification.

RICHARD T. NEWTON.